United States Patent
Beamish et al.

(10) Patent No.: US 6,694,143 B1
(45) Date of Patent: Feb. 17, 2004

(54) SYSTEM FOR USING A LOCAL WIRELESS NETWORK TO CONTROL A DEVICE WITHIN RANGE OF THE NETWORK

(75) Inventors: Norman J. Beamish, Costa Mesa, CA (US); Robert Saunders, Irvine, CA (US); John S. Walley, Ladera Ranch, CA (US); Hon M. Yung, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 462 days.

(21) Appl. No.: 09/658,729

(22) Filed: Sep. 11, 2000

(51) Int. Cl.⁷ .................................................. H04Q 7/20
(52) U.S. Cl. ................... 455/456.1; 455/41.2; 455/420; 455/90.1; 381/312; 381/315
(58) Field of Search ................................ 455/435, 456, 455/13.1, 432, 420, 431, 568, 569, 90, 41; 381/312, 314, 315

(56) References Cited

U.S. PATENT DOCUMENTS 4,752,951 A * 6/1988 Konneker .............. 379/201.07

(List continued on next page.)

FOREIGN PATENT DOCUMENTS

| EP | EP 0 891 110 A1 | 1/1999 | |
| IL | WO 99/55102 | * 10/1999 | ............ H04Q/7/20 |
| WO | WO 99/55102 | 10/1999 | |

OTHER PUBLICATIONS

Weiss K et al., "Conventional Local Area Radio Coverage System", Motorola Technical Developments, Motorola Inc. Schaumburg, Illinois, US, vol. 13. Jul. 1, 1991, pp. 67–69.

Primary Examiner—William Trost
Assistant Examiner—Marcos Torres
(74) Attorney, Agent, or Firm—Farjami & Farjami LLP

(57) ABSTRACT

This invention provides a communication device that is capable of interacting with a local wireless communication system when the communication device is within range of the local wireless communication system for controlling operating characteristics of the communication device. The communication device may include cellular telephones, mobile phones, voice pagers, data pagers, mobile computers, palm computers, mobile facsimile machines, mobile appliances, multimedia devices and other wireless communication devices. The local wireless communication system may be located in any site such as an office building, home, hotel, concert hall, movie theater, restaurant, conference room, or public transportation systems.

When the local wireless communication system determines that a command is to be sent, the system may transmit a command to all communication devices that are within range of the local wireless communication system, or to a subset of them. For example, the local wireless communication system in an airplane may send a command to all cell phones within its range to turn off to prevent harmful interference with the airplanes communication system. As another example, a local wireless communication system in a concert hall may send a command to change a wireless communication device from ringing mode to vibrate mode during a concert. The command may be any kind of command. The command can change an operating characteristic of the wireless communication device while optionally giving the device the continued ability to communicate and interact with other communication networks. In another alternative, a wireless communication device such as a cell phone may receive information about a user's hearing aid and its "prescription" from a local wireless communication system and change its output characteristics to emulate the hearing aid so that the user can use the wireless communication device without the hearing aid. Also, wireless communication device may communicate with a local wireless communication system to turn off a user's headphone when the wireless communication device receives an incoming call or data signal.

37 Claims, 3 Drawing Sheets

U.S. PATENT DOCUMENTS

| | | | | |
|---|---|---|---|---|
| 5,153,902 A | * | 10/1992 | Buhl et al. | 455/432.1 |
| 5,293,645 A | * | 3/1994 | Sood | 455/456.2 |
| 5,341,410 A | * | 8/1994 | Aron et al. | 455/410 |
| 5,493,286 A | * | 2/1996 | Grube et al. | 340/7.25 |
| 5,561,704 A | * | 10/1996 | Salimando | 455/456.5 |
| 5,774,802 A | * | 6/1998 | Tell et al. | 455/408 |
| 5,842,131 A | * | 11/1998 | Yamane | 455/456.1 |
| 5,905,719 A | * | 5/1999 | Arnold et al. | 370/330 |
| 5,905,957 A | * | 5/1999 | Olds | 455/435.1 |
| 6,006,115 A | * | 12/1999 | Wingate | 455/575.2 |
| 6,212,496 B1 | * | 4/2001 | Campbell et al. | 704/221 |

* cited by examiner

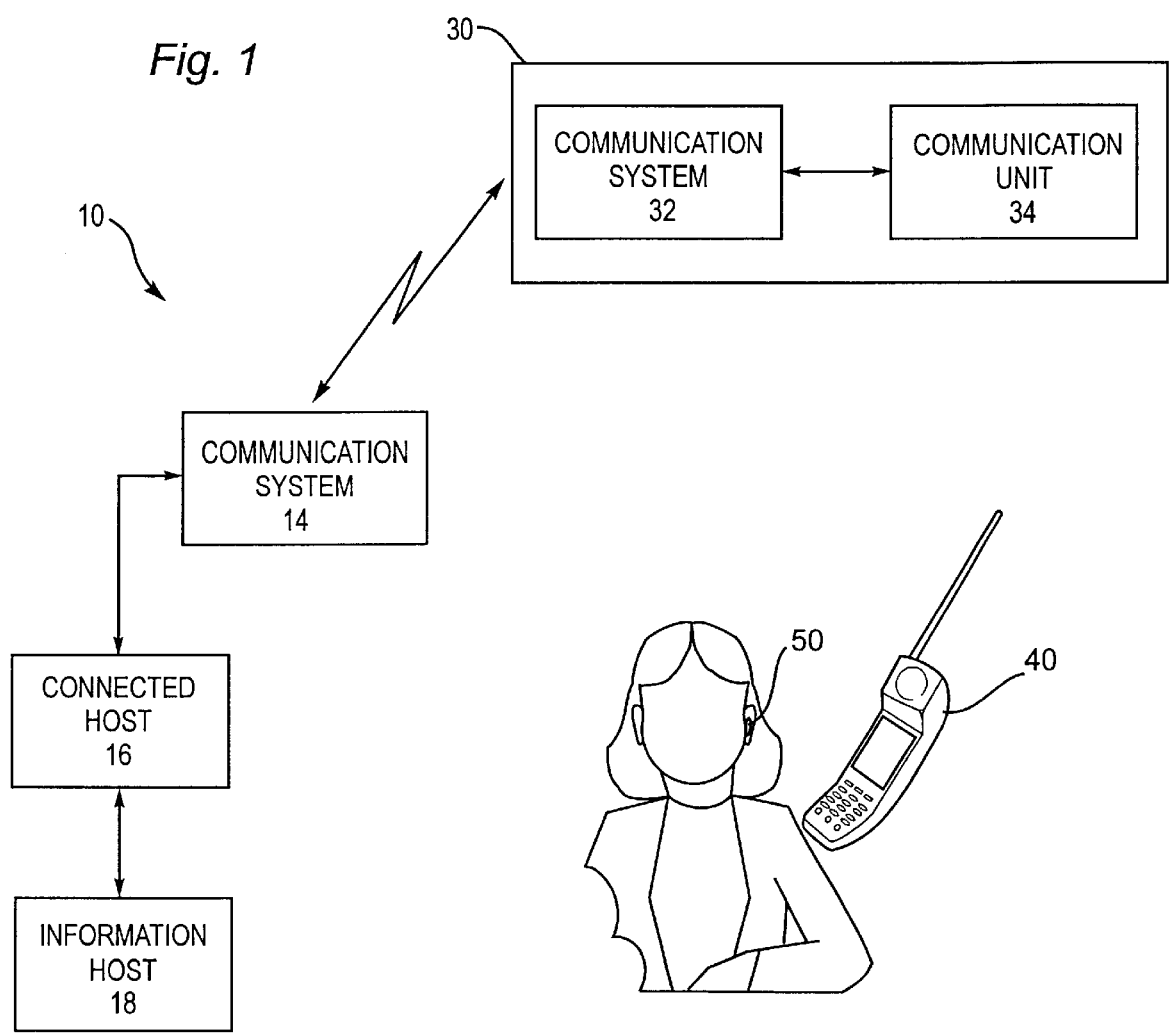
Fig. 1
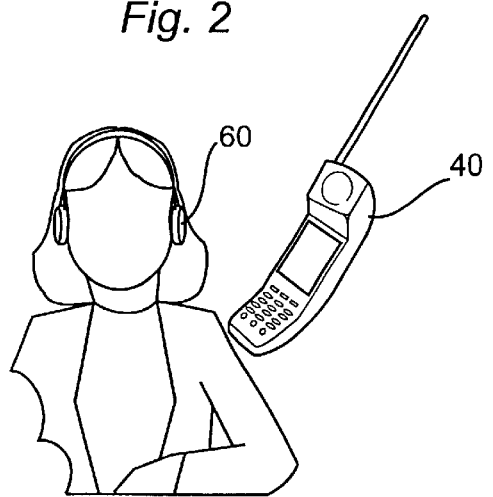
Fig. 2
Fig. 3

SYSTEM FOR USING A LOCAL WIRELESS NETWORK TO CONTROL A DEVICE WITHIN RANGE OF THE NETWORK

BACKGROUND OF THE INVENTION

1. Field of the Invention

The field of the invention relates generally to wireless communication devices whose functions may be controlled by a local wireless network such as a Bluetooth wireless network.

2. Related Art

Wireless communication devices are capable of transmitting and/or receiving signals carrying voice or data information. Examples of wireless communication devices include cellular telephones, pagers, wireless personal assistants, wearable computers with wireless Internet capabilities, and other devices capable of receiving and possibly transmitting information. These wireless communication devices communicate on and through an existing communication network infrastructure that may be wired or wireless. When the communication device is within range of a compatible communication network infrastructure, the wireless communication device may communicate with other wireless/wireline communication devices.

However, as the popularity of these wireless communication devices has increased dramatically in recent years, the problems caused by these devices have also increased. For example, ringing cell phones and pagers may annoy third parties or disrupt events being enjoyed by others. For example, airlines ask passengers to turn off their cell phones just before takeoff and landing so that passengers may be attentive to safety briefings. However, passengers are known to disobey or forget to comply with the airline's requests. Similar risks of interference with telemetry systems may occur at other locations such as hospitals. Thus, there is a need for institutions to control the use of communication devices that are within a certain range of a sensitive institution or environment.

Similarly, communication devices have rudimentary systems for interacting with the user. For example, cell phones and pagers may ring or vibrate. Although a user can set the tone and volume of the ring, a user who is wearing headphones or a hearing aid may miss the call or page. Additionally, it is difficult for a hearing impaired person who relies on a hearing aid to use a cell phone. Hence, there is a need for an improved system for taking these situations into account.

A Bluetooth local network is a short range wireless communication network as defined by the Bluetooth standard. See the website http://www.bluetooth.com on the internet for additional details about the Bluetooth local network. The Bluetooth local network has a radio transceiver that operates in a globally available frequency band (2.4 giga hertz). A Bluetooth network infrastructure may be able to solve many of the limitations existing in current communications with respect to controlling wireless communication devices with network enabling commands transmitted from the network infrastructure.

SUMMARY

This invention provides a wireless communication device that is capable of interacting with a wireless communication system infrastructure such that when the wireless communication device is within range of the infrastructure operating characteristics of the wireless communication device may be controlled. The wireless communication system infrastructure may be local or wide-area and may include, but not limited to, a Bluetooth local network, an infrared interface standard (IRDA), a network based on the 802.15 wireless local area network (LAN) standard, a network based on the 802.11 wireless LAN standard, a digital enhanced cordless telephone (DECT), or another communication system. The local wireless communication system infrastructure may be located in any site such as a concert hall, movie theater, restaurant, conference room, public transportation system such as an airplane, or airport. When the local wireless communication system infrastructure determines that a command is to be sent, the system may transmit a command to all wireless communication devices that are within range of the local wireless communication system infrastructure, or to a subset of them. The selection of wireless communication devices may be affected may be based on the type of communication device (e.g., pager vs. cell phone), the model of the communication device (e.g., Nokia 6190 cell phone vs. Motorola Star Tac cell phone), or any other selection criteria. For example, the local wireless communication system infrastructure in an airplane may send a command to all cell phones within its range to turn off at the time the airplane leaves the gate. As another example, a local wireless communication system infrastructure in a concert hall may send a command to change a cell phone from ringing mode to vibrate mode during a concert. The command may be any kind of command. The command can change any operating characteristic or function of the communication device, or cause the communication device to execute any set of instructions. For instance, the command can change any human perceptible indicator in the communication device such as the display, light, audible signal generator, vibrator and the like. The command may also optionally give the communication device the continued ability to communicate and interact with other communication networks. For instance, a local wireless communication system infrastructure in a concert hall may cause all cell phones and pagers to switch from ringing mode to vibrate mode from 7:30 p.m. to 10 p.m. when a concert is in session. As a result, the cell phones and pagers can still communicate with their own communication networks to receive calls and pages, but an operating characteristic of the cell phones and pagers has been altered. Because there may be many local wireless communication systems, each of which established in a different or overlapping location, a wireless communication device can enter and exit various local wireless communication systems seamlessly.

Using a local wireless communication system infrastructure may also transmit data to or receive data from a communication device residing within its range. For example, the local wireless communication system may send weather information, local temperatures, local news and other data to the wireless communication device. Communication devices may use the local wireless communication system to communicate with the internet so that the communication device does not need to dial directly into the internet service provider (ISP) by its own means (e.g., modem, satellite, etc).

A communication device such as a cell phone may receive information about a user's hearing aid and its "prescription" from a local wireless communication system and change its output characteristics to emulate the hearing aid so that the user can use the cell phone without the hearing aid. In another alternative, a cell phone can communicate with a local wireless communication system to turn off a user's headphone when the cell phone rings. In still another alternative embodiment, the local wireless communication system can control any other device within the control of a wireless communication system. For instance, when a user turns on the television, the local wireless communication system knows that the television was turned on and thus automatically turns down or off the light near the television.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. Moreover, in the figures, like reference numerals designate corresponding parts throughout the different views.

FIG. 1 illustrates a block diagram of an embodiment of a wireless communication device and local wireless network system infrastructure.

FIG. 2 illustrates a wireless communication device that interacts with a hearing aid.

FIG. 3 illustrates a wireless communication device that interacts with a headphone.

DETAILED DESCRIPTION

Figure 4:
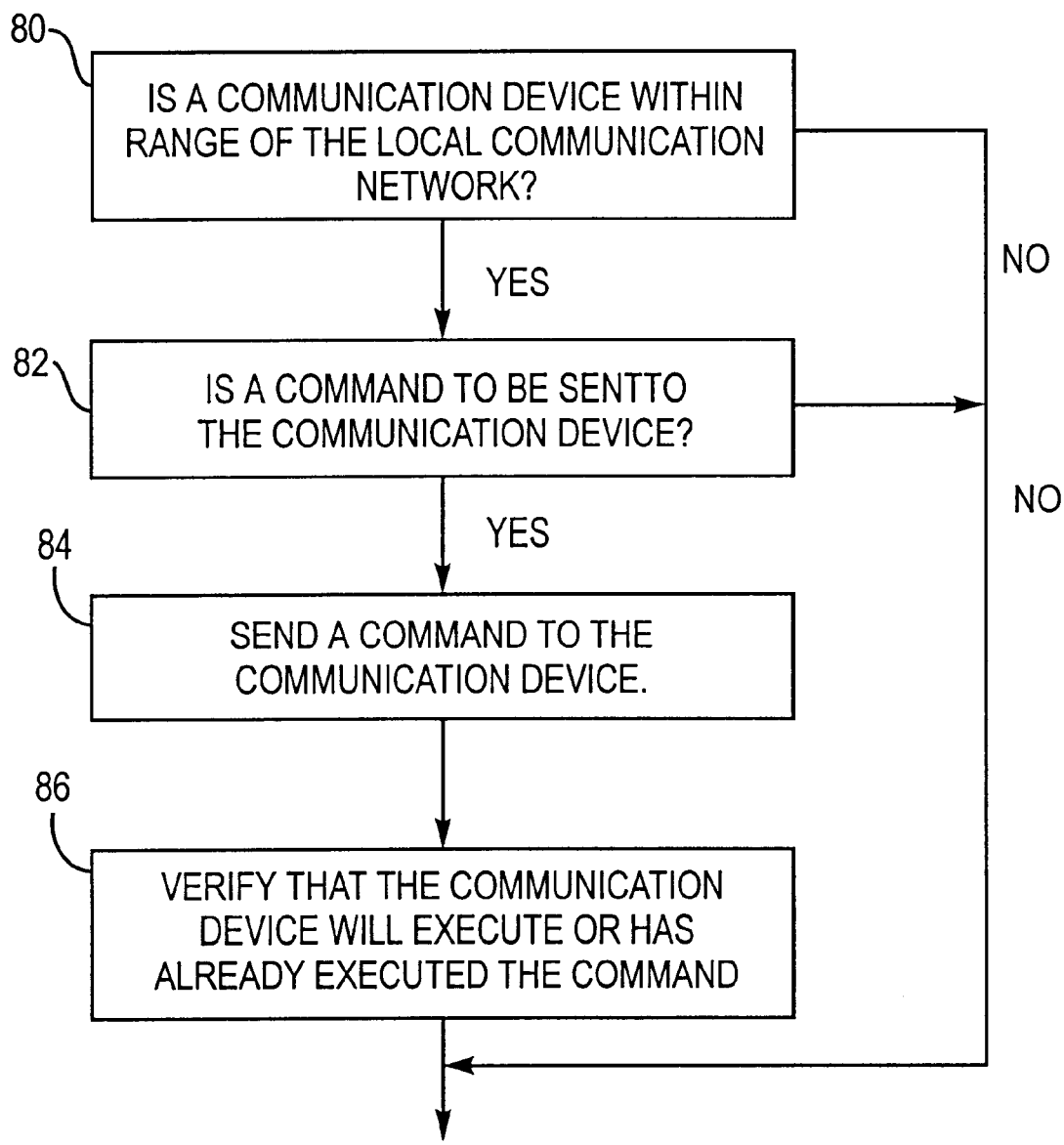
FIG. 4 illustrates a flowchart of an embodiment of a software program in a local communication network system infrastructure.

FIG. 1 illustrates a block diagram of an example embodiment of a communication device and local wireless network system. In FIG. 1, a local wireless communication system 10 is shown. The local wireless communication system 10 includes a communication system 14, a connected host 16 and a source 18 of information. The host 16 may be any kind of computer system such as a personal computer, host computer, server, network system, or any other kind of computing system. The host interacts with the communication system 14 and the information source 18. The information source 18 may be a database, a network, a source of constants, or any other source of any kind of information. The communication system 14 may be any kind of communicating system including, but not limited to, a Bluetooth local network, an IRDA (infrared interface standard), a network based on the 802.15 wireless local area network (LAN) standard, a network based on the 802.11 wireless LAN standard, a DECT (digital enhanced cordless telephone), or any other communication system known to those of ordinary skill in the art.

The local wireless communication system 10 can communicate with wireless communication devices within a short range, typically ten to one hundred meter range. In order for a communication device 30 to communicate or interact with the local wireless communication system 10, the communication device 30 may have a communication system 32, such as a Bluetooth integrated circuit chip with a radio transceiver, built into the communication device 30 as well as any requisite software. The communication system 32 is able to communicate with the communication system 14. Because the local wireless communication system 10 is a data network, data as well as commands may be passed between the local wireless communication system 10 and any communication or data device 30 located within the operative range of the local wireless communication system 10. The local wireless communication system 10 instantly connects with communication devices within its range even if the communication device is not within line-of-sight. Additional security and authentication procedures may be used by the local wireless communication system 10 to protect users' privacy and data transmission. The range of a local wireless communication system 10 may or may not overlap the range of other communication networks.

A local wireless communication system 10 knows when a wireless communication device 30 enters or exits the operative range of the local wireless communication system infrastructure 10. A wireless communication device may include, but not be limited to, cellular telephones, mobile phones, voice pagers, data pagers, mobile computers, palm computers, mobile facsimile machines, mobile appliances, multimedia devices, televisions and lights that are able to communicate with each other or on a communication network to other communication wireline/wireless devices. Because there may be many local wireless communication systems, each established in a different location, or, even in an overlapping manner, a wireless communication device 30 can enter and exit various local wireless communication systems infrastructures as long as the architecture of the wireless communication devices and the communication network infrastructure is compatible.

A communication device 30 may comprise a control logic, an interface for communicating with the local wireless communication system as well as other communication networks, and a detector for determining whether the communication device 30 is within range of a local wireless communication system. The detector may be part of the control logic. The control logic may include any control unit such as a microprocessor, microcontroller, arithmetic logic unit (ALU), central processing unit (CPU), programmable gate array, control circuit, discrete analog or digital hardware and software. The wireless communication device 30, of course, may have any of the many other features and functions known to those of skill in the art including, but not limited to, a printer and a human perceptible indicator such as a display, light, audible signal generator, vibrator and the like.

When a wireless communication device 30 enters the operative range of a local wireless communication system 10, the device 30 is subject to the environment created by that local wireless communication system 10. The local wireless communication system 10 may send a command to the communication device 30 so that the device 30 will change its operating characteristics or functions. Alternatively, the communication device 30 may not receive a command from the local wireless communication system 10, but rather detect that it is subject to the local wireless communication system 10 and automatically changes its function or operating characteristic. Moreover, any kind of operating characteristics, functions or combinations of functions can be changed. Further, these functions and characteristics may be automatically changed without user intervention or knowledge.

For example, if the communication device 30 is a cellular phone, although the cell phone can communicate and interact with its cell phone communications network, once the cell phone enters the operative range of a local wireless communication system 10, the local wireless communication system 10 may send a command to the cell phone so that the cell phone will change its operating characteristics so that it behaves a certain way so long as the cell phone is within the operative range.

A local wireless communication system 10 may be set up in a concert hall, restaurant, church, movie theater, meeting room, conference room, or another location to instruct all communication devices 30 within its operative range (e.g., the concert hall) to automatically turn off, ring silent, vibrate instead of ring, etc. The local wireless communication system 10 may cause the wireless communication device 30 to automatically activate any human perceptible indicator in the communication device 14 to the user such as activating a buzzer, a light, a vibrator and the like. Similarly, the local wireless communication system 10 may disable any human perceptible indicator in the communication device 30 so as to, for example, preserve the sanctity and quietness of the area. Another enhancement may include making the wireless communication device 30 such as a cell phone "quiet" during certain times of day. The local wireless communication system 10 may control communication devices differently based on the type or model of communication device. For instance, certain communication devices 30 such as pagers can be turned off, while other types of communication devices such as cell phones can be left turned on. Alternatively, model number 123 of cell phones can be set to vibrate mode, while model number 348 of cells phones can be turned off completely. In other words, the local wireless communication system 10 can dictate the rules that a wireless communication device 30 must operate when the communication device 30 is within the local wireless communication system's 10 range, while possibly allowing the communication device 30 the continued ability to communicate and interact with its primary communication network infrastructure system such as base stations and corresponding mobile switching systems.

Another application may be to change the communication attributes of the wireless communication device 30. For example, airlines do not permit the use of cell phones during certain times such as when the airplane is about to takeoff or about to land. Accordingly, an airline may establish a local wireless communication system 10 whose operative range is sufficiently short so as to only affect users in the airplane. This would allow the airline (e.g., pilot or crew) to selectively send out commands to all cell phones (or pagers or both) within its range that disable the user's ability to use the cell phone until another command is sent to the cell phones allowing the cell phones to be used. As a result, the local wireless communication system 10 can change the communication attributes, such as radio frequency (RF) attributes, of a cell phone or other device.

The information source 18 contains the information and data for the local wireless communication system 10 and/or communication device 30. For example, the information source 18 may contain a database of the types of communication devices that it controls and the specific function to control for each type. As another example, the information source 18 may contain a database of the various model numbers of cell phones that it can control and the specific function to control for each model. The information source 18 may also contain the time of day or the time zone in which the local wireless communication system 10 resides so that the communication device 30 can be controlled based on the time of day or the time zone. For instance, a local wireless communication system 10 in a concert hall may disable all cell phones and pagers from 7:30 p.m. to 10 p.m. when a concert is in session.

The local wireless communication system 10 may also transmit data to or receive data from a communication device 30 residing within its range. For example, a local wireless communication system 10 may send weather information, local temperatures, local news and other data to a communication device 30. The local wireless communication system 10 may likewise receive data such as the model number from a communication device 30. Communication devices 30 may use a local wireless communication system 10 to communicate with the internet so that the communication device 30 does not need to dial directly into the internet service provider (ISP) by its own means (e.g., modem, satellite, etc).

In an alternative embodiment, the local wireless communication system 10 optionally may control any other device within the control of a wireless communication system 14. For instance, when a user turns on the television, the local wireless communication system 14 knows that the television was turned on and thus automatically turns down or off a light placed near the television.

As shown in FIG. 2, one embodiment of a communication device 30 maybe a cell phone 40 that interacts with a user's hearing aid 50 via a local wireless communication system 10. People who wear hearing aids often cannot use a wireless communication device such as a cell phone because the cell phone may not work with the hearing aid in place and if they remove the hearing aid, they cannot hear the cell phone. A local wireless communication system 10 may be worn as a separate device on the user or be incorporated into the user's hearing aid 50. When the cell phone 40 enters the range of the local wireless communication system 10, the cell phone 40 receives information about the hearing aid and its "prescription." For example, the cell phone 40 may receive the information about the operating amplitude and frequencies of the hearing aid 50 so that the cell phone 40 can emulate the hearing aid 50. By changing the signal output by the cell phone 40 to correspond to that of the hearing aid, the user can use the cell phone 40 without his hearing aid 50.

As shown in FIG. 3, another embodiment of a communication device 30 may be a cell phone 40 that interacts with a user's headphones or headset 60 via a local wireless communication system 10. When the cell phone 30 receives an incoming phone call, it can interact with the local wireless communication system 10 to attenuate, lower or turn off the volume in the headphones 60. Thus, the user will not miss a phone call. Therefore, the possibilities of control over a communication device 30 by a local wireless communication system 10 (or as previously discussed, by any type of communication system) are endless.

FIG. 4 illustrates a flowchart of an example software program used in a local communication system 10. The local wireless communication system 10 may detect whether there is a communication device within its range by sending out queries, as shown in step 80. Alternatively, the local wireless communication system 10 may broadcast commands so that all communication devices within its range will receive those commands. In step 82, the local wireless communication system 10 determines whether a command is to be sent. For example, if the local wireless communication system 10 is in a concert hall or movie theater, there may be certain days as well as certain times of day that communication devices must be told to be silent. The local wireless communication system 10 may send a command to selective communication devices or all of them. For instance, certain models of pagers are to be set to vibrate mode while all cell phones and other models of pagers are to be completely turned off. Once the local wireless communication system 10 determines whether to send a command and what command to send, it does so in step 84. It may do so selectively or via a broadcast mode. In step 86, the system 10 may optionally verify that the command was or will be executed. For example, the system 10 may query the communication device or the communication device may send a verification response to the system 10 indicating whether the command will be executed. Of course, other variations and options are possible.

Figure 5:
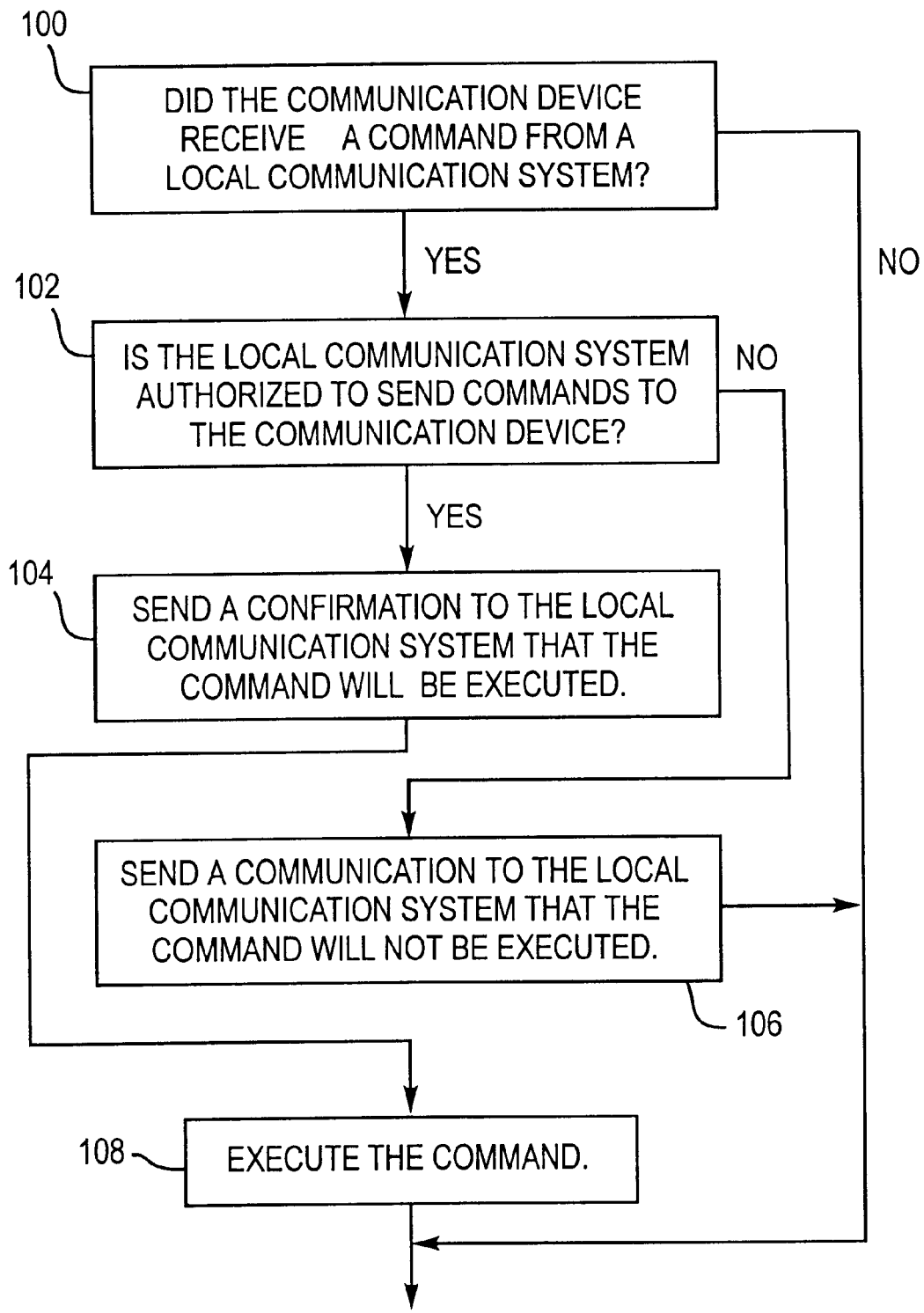
FIG. 5 illustrates a flowchart of an embodiment of a software program in a wireless communication device.

FIG. 5 illustrates a flowchart of an example software program used in a communication device. A communication device may receive queries and/or commands. If a query is received, the device may respond to it. If it receives a command in step 100, the communication device determines whether it should ignore or execute the command in step 102. For example, the communication device may know which types of local wireless communication systems that it will obey and which it will not. If the command is to be executed, the communication device optionally informs the local wireless communication system (step 104) and executes the command (step 108). If the command is not to be executed, the communication device may optionally inform the local wireless communication system (step 106).

While various embodiments of the application have been described, it will be apparent to those of ordinary skill in the art that many more embodiments and implementations are possible that are within the scope of the subject invention. Accordingly, the invention is not to be restricted except in light of the attached claims and their equivalents.

What is claimed is:

1. A method for controlling an operating characteristic of a user's communication device, comprising the steps of:
   providing a communication device that operates within a first communication network and is capable of operating within a second communication network, the second communication network being a local wireless communication system having a limited range of communication where the communication device can communicate with the local wireless communication system when the communication device is within the range of the local wireless communication system;
   detecting whether the communication device is within range of the second communication network;
   interacting with the second communication network if the communication device is within range of the second communication network, the second communication network automatically changing the operating characteristic of the communication device; and
   providing a hearing aid located within the range of the second communication network and having a certain operating condition where the interacting step causes the communication device to emulate the operating condition of the hearing aid when the communication device is within the range.

2. The method of claim 1 wherein the second communication network automatically controls an operating characteristic of the communication device that the first communication network does not control.

3. The method of claim 2 wherein the communication device is a cellular phone and the operating characteristic is the volume, ringer, or light.

4. The method of claim 1 wherein the communication device communicates with both the second communication network and the first communication network.

5. The method of claim 1 wherein the local wireless communication system is a Bluetooth local network, an IRDA, a wireless local area network, or a digital enhanced cordless telephone network.

6. The method of claim 1 wherein the interacting step automatically activates or deactivates a human perceptible indicator in the communication device.

7. The method of claim 6 wherein the human perceptible indicator is a buzzer, light, or vibrator.

8. The method of claim 1 where the interacting step controls the communication device in a first manner if the communication device is a first type of communication device and in a second manner if the communication device is a second type of communication device.

9. The method of claim 1 where the interacting step controls the communication device in a first manner during a first pre-determined time of day and in a second manner during a second pre-determined time of day.

10. The method of claim 9 wherein the interacting step automatically activates a human perceptible indicator in the communication device during the first pre-determined time of day and deactivates the human perceptible indicator during the second pre-determined time of day.

11. The method of claim 1 further comprising the step of setting the range of the local wireless communication system to be substantially equal to the area of an airplane and the interacting step changes the operating characteristic of the communication device if the communication device is located within the range.

12. The method of claim 1 further comprising the step of setting the range of the local wireless communication system to be substantially equal to the area of a room and the interacting step changes the operating characteristic of the communication device if the communication device is located within the range.

13. The method of claim 1 further comprising the step of providing access to the internet to the communication device if the communication device is located within the range of the local wireless communication system.

14. The method of claim 1 wherein the communication device emulates the frequency output of the hearing aid.

15. The method of claim 1 wherein the communication device emulates the volume of the hearing aid.

16. The method of claim 1 wherein the communication device is a cellular telephone, mobile phone, voice pager, data pager, mobile computer, palm computer, mobile facsimile 5 machine, mobile appliance, or multimedia device.

17. The method of claim 1 further comprising the step of providing a headset located within the range of the second communication network and having a certain operating condition where the interacting step causes the communication device to control the operating condition of the headset.

18. The method of claim 17 wherein the interacting step causes the communication device to lower or turn off the volume in the headset.

19. The method of claim 1 wherein the communication device operates within a first communication network and is capable of operating within a second and third communication networks, the second and third communication networks being local wireless communication systems, each local wireless communication system having a limited range of communication, where the communication device can communicate with the second communication network when the communication device is within the range of the second communication network and can communicate with the third communication network when the communication device is within the range of the third communication network and the interacting step further includes changing automatically the operating characteristic of the communication device in a first manner if the communication device is within range of the second communication network and changing automatically the operating characteristic of the communication device in a second manner if the communication device is within range of the third communication network.

20. A communication device that interacts with a local wireless communication system for controlling an operating characteristic of the communication device, comprising:
- an interface for communicating with a first communication network and a second communication network, the second communication network being a local wireless communication system having a limited range of communication where the communication device can communicate with the local wireless communication system when the communication device is within the range of the local wireless communication system;
- a detector that determines whether the communication device is within range of the second communication network;
- a control logic that interacts with the second communication network if the communication device is within range of the second communication network and in response to the second communication network, the control logic automatically changing the operating characteristic of the communication device; and
- a hearing aid located within the range of the second communication network and having a certain operating condition where the control logic causes the communication device to emulate the operating condition of the hearing aid when the communication device is within the range.

21. The communication device of claim 20 wherein the control logic permits the second communication network to automatically control an operating characteristic of the communication device that the first communication network does not control.

22. The communication device of claim 20 wherein the communication device is a cellular phone and the operating characteristic is the volume, ringer, or light.

23. The communication device of claim 20 wherein the interface permits the communication device to communicate with both the first and second communication networks when the communication device is within range of the first and second communication networks.

24. The communication device of claim 20 wherein the local wireless communication system is a Bluetooth local network, an IRDA, a wireless local area network, or a digital enhanced cordless telephone network.

25. The communication device of claim 20 further comprising a human perceptible indicator in the communication device that the control logic may automatically activate or deactivate.

26. The communication device of claim 25 wherein the human perceptible indicator is a buzzer, light, or vibrator.

27. The communication device of claim 20 where the control logic in response to the second communication network controls the communication device in a first manner if the communication device is a first type of communication device and in a second manner if the communication device is a second type of communication device.

28. The communication device of claim 20 where the control logic in response to the second communication network controls the communication device in a first manner during a first pre-determined time of day and in a second manner during a second pre-determined time of day.

29. The communication device of claim 20 further comprising a human perceptible indicator in the communication device wherein the control logic automatically activates the human perceptible indicator in the communication device during the first pre-determined time of day and deactivates the human perceptible indicator during the second pre-determined time of day.

30. The communication device of claim 20 wherein the range of the local wireless communication system is substantially equal to the area of an airplane and the control logic determines whether the communication device is located within the range and changes the operating characteristic of the communication device if the communication device is located within the range.

31. The communication device of claim 20 wherein the range of the local wireless communication system is substantially equal to the area of a room and the control logic changes the operating characteristic of the communication device if the communication device is located within the range.

32. The communication device of claim 20 wherein the second communication network provides access to the internet to the communication device through the interface if the communication device is located within the range of the second communication network.

33. A communication device for a hearing-impaired user who uses a hearing aid having an operating condition, the communication device interacting with a local wireless communication system for controlling an operating characteristic of the communication device, comprising:
- an interface for communicating with a first communication network and a second communication network, the second communication network being a local wireless communication system having a limited range of communication encompassing the hearing aid where the communication device can communicate with the second communication network when the communication device is within the range of the second communication network;
- a detector that determines whether the communication device is within range of the hearing aid in the second communication network; and
- a control logic that receives information about the operating condition of the hearing aid from the second communication network if the communication device is within range of the second communication network, the control logic automatically emulating the operating condition of the hearing aid when the communication device is within the range.

34. The communication device of claim 33 wherein the communication device is a cellular telephone, mobile phone, voice pager, data pager, mobile computer, palm computer, mobile facsimile machine, mobile appliance, or multimedia device.

35. The communication device of claim 33 wherein the control logic automatically emulates the frequency output of the hearing aid.

36. The communication device of claim 33 wherein the control logic automatically emulates the volume of the hearing aid.

37. The communication device of claim 20 wherein the communication device is a cellular telephone, mobile phone, voice pager, data pager, mobile computer, palm computer, mobile facsimile machine, mobile appliance, or multimedia device.

* * * * *